(12) United States Patent
Zhao

(10) Patent No.: US 12,431,581 B2
(45) Date of Patent: Sep. 30, 2025

(54) CAP FOR FULL-TAB CYLINDRICAL LITHIUM BATTERY AND FULL-TAB CYLINDRICAL LITHIUM BATTERY

(71) Applicant: SHENZHEN BAK POWER BATTERY CO., LTD., Shenzhen (CN)

(72) Inventor: Junfeng Zhao, Shenzhen (CN)

(73) Assignee: SHENZHEN BAK POWER BATTERY CO., LTD., Shenzhen (CN)

( * ) Notice: Subject to any disclaimer, the term of this patent is extended or adjusted under 35 U.S.C. 154(b) by 505 days.

(21) Appl. No.: 17/774,602

(22) PCT Filed: Aug. 6, 2021

(86) PCT No.: PCT/CN2021/111288
§ 371 (c)(1),
(2) Date: May 5, 2022

(87) PCT Pub. No.: WO2022/088828
PCT Pub. Date: May 5, 2022

(65) Prior Publication Data
US 2022/0399609 A1 Dec. 15, 2022

(30) Foreign Application Priority Data
Oct. 29, 2020 (CN) .......................... 202022454921.9

(51) Int. Cl.
*H01M 50/342* (2021.01)
*H01M 50/143* (2021.01)
(Continued)

(52) U.S. Cl.
CPC ..... *H01M 50/3425* (2021.01); *H01M 50/143* (2021.01); *H01M 50/152* (2021.01); *H01M 50/184* (2021.01); *H01M 50/186* (2021.01)

(58) Field of Classification Search
CPC .......... H01M 50/3425; H01M 50/143; H01M 50/152; H01M 50/184; H01M 50/186; H01M 50/107; Y02E 60/10
See application file for complete search history.

(56) References Cited

U.S. PATENT DOCUMENTS

2003/0013005 A1 1/2003 Chang
2005/0260487 A1 11/2005 Kim et al.
(Continued)

FOREIGN PATENT DOCUMENTS

CN 2845183 Y * 12/2006
CN 101170169 A 4/2008
(Continued)

OTHER PUBLICATIONS

Extended European Search Report from corresponding European Patent Application No. 21870549.9, dated Feb. 2, 2024.
(Continued)

*Primary Examiner* — Daniel S Gatewood
(74) *Attorney, Agent, or Firm* — Westman, Champlin & Koehler, P.A.

(57) ABSTRACT

This application is applicable to the technical field of lithium batteries, and provides a full-tab cylindrical lithium battery cap and a full-tab cylindrical lithium battery, including an explosion-proof valve, an isolation ring, a connecting plate and a sealing ring, and the isolation ring is arranged between the explosion-proof valve and the connecting plate, the sealing ring is sleeved on an edge of the explosion-proof valve; the explosion-proof valve includes a connecting portion and an explosion-proof portion, the connecting portion is arranged along a circumference of the explosion-proof portion, and the edge of the connecting portion abuts on the sealing ring, the explosion-proof portion is provided with a rupture line, and the connecting portion is thicker than the explosion-proof portion. The full-tab cylindrical lithium (Continued)

battery cap provided in this application is formed by combining an explosion-proof valve, an isolation ring, a connecting plate and a sealing ring.

12 Claims, 2 Drawing Sheets

(51) Int. Cl.
*H01M 50/152* (2021.01)
*H01M 50/184* (2021.01)
*H01M 50/186* (2021.01)

(56) References Cited

U.S. PATENT DOCUMENTS

| | | |
|---|---|---|
| 2006/0019158 A1 | 1/2006 | Mori et al. |
| 2009/0208830 A1 | 8/2009 | Okabe et al. |
| 2011/0008654 A1 | 1/2011 | Kim |
| 2012/0040215 A1 | 2/2012 | Zhu |
| 2014/0004396 A1 | 1/2014 | An |
| 2018/0069268 A1 | 3/2018 | Nakamura et al. |
| 2019/0103625 A1 | 4/2019 | Haraguchi et al. |
| 2020/0295319 A1 | 9/2020 | Ko et al. |
| 2022/0029232 A1 | 1/2022 | Kashimura et al. |

FOREIGN PATENT DOCUMENTS

| | | | |
|---|---|---|---|
| CN | 201623187 U | * | 11/2010 |
| CN | 201820810 U | | 5/2011 |
| CN | 101170167 B | | 1/2012 |
| CN | 102306712 A | | 1/2012 |
| CN | 102629688 A | | 8/2012 |
| CN | 202905891 U | | 4/2013 |
| CN | 204441382 U | | 7/2015 |
| CN | 106410102 A | | 2/2017 |
| CN | 206040781 U | | 3/2017 |
| CN | 206040782 U | | 3/2017 |
| CN | 206711986 U | | 12/2017 |
| CN | 206742369 U | | 12/2017 |
| CN | 207676956 U | | 7/2018 |
| CN | 208225932 U | | 12/2018 |
| CN | 208284541 U | | 12/2018 |
| CN | 208284552 U | | 12/2018 |
| CN | 208422973 U | | 1/2019 |
| CN | 208986073 U | | 6/2019 |
| CN | 209389074 U | | 9/2019 |
| CN | 209389114 U | * | 9/2019 |
| CN | 110379993 A | | 10/2019 |
| CN | 209472006 U | | 10/2019 |
| CN | 209472008 U | * | 10/2019 |
| CN | 110504401 A | | 11/2019 |
| CN | 210403784 U | | 4/2020 |
| CN | 211789215 U | | 10/2020 |
| CN | 213520044 U | | 6/2021 |
| CN | 213520231 U | | 6/2021 |
| CN | 213520238 U | | 6/2021 |
| CN | 214336803 U | | 10/2021 |
| JP | 2007250442 A | | 9/2007 |
| WO | 2007134091 A2 | | 11/2007 |
| WO | 2020/137778 | | 2/2020 |
| WO | 2022088827 A1 | | 5/2022 |
| WO | 2022088829 A1 | | 5/2022 |

OTHER PUBLICATIONS

Extended European Search Report from corresponding European Patent Application No. 21870550.7, dated Feb. 2, 2024.
International Search Report and Written Opinion dated Nov. 1, 2021 for PCT/CN2021/111311, filed Aug. 6, 2021.
Written Opinion dated Oct. 26, 2021 for PCT/CN2021/111309, filed Aug. 6, 2021.
International Search Report dated Oct. 26, 2021 for PCT/CN2021/111309, filed Aug. 6, 2021.
International Search Report dated Nov. 2, 2021 for PCT/CN2021/111287, filed Aug. 6, 2021.
Written Opinion dated Nov. 2, 2021 for PCT/CN2021/111287, filed Aug. 6, 2021.
U.S. Application and Drawings for U.S. Appl. No. 17/777,935, filed May 18, 2022.
U.S. Application and Drawings for U.S. Appl. No. 17/743,781, filed May 13, 2022.
U.S. Application and Drawings for U.S. Appl. No. 17/778,915, filed May 23, 2022.
International Search Report and Written Opinion dated Sep. 28, 2021 for PCT/CN2021/111288, filed Aug. 6, 2021.
The Extended European Search Report from corresponding European Application No. 21870562.2, dated Sep. 17, 2024.
First Office Action from corresponding Chinese Patent Application No. 202011178413.0, dated Nov. 13, 2024; machine translation.
Office Action from related U.S. Appl. No. 17/743,781, dated Oct. 23, 2024.
The Extended European Search Report from European Patent Application No. 21870560.6, dated Apr. 14, 2025.
Office Action from U.S. Appl. No. 17/778,915, dated Mar. 13, 2025.
International Search Report and Written Opinion from PCT/CN2021/111311, dated Nov. 1, 2021.
Written Opinion from PCT/CN2021/111309, dated Oct. 26, 2021.
Written Opinion from PCT/CN2021/111287, dated Nov. 2, 2021.
International Search Report and Written Opinion from PCT/CN2021/111288, dated Sep. 28, 2021.

* cited by examiner

CAP FOR FULL-TAB CYLINDRICAL LITHIUM BATTERY AND FULL-TAB CYLINDRICAL LITHIUM BATTERY

CROSS REFERENCE

This application is a Section 371 National Stage Application of International Application No. PCT/CN2021/111288, filed Aug. 6, 2021 and claims the priority of the Chinese Patent Application No. 202022454921.9 filed with the Chinese Patent Office on Oct. 29, 2020, the entire contents of which are incorporated herein by reference.

BACKGROUND

Technical Field

The present application relates to the technical field of lithium batteries, and more specifically, to a full-tab cylindrical lithium battery cap and a full-tab cylindrical lithium battery.

The existing cap for a cylindrical lithium battery includes a top cover, an explosion-proof disc, an isolation ring, a connecting plate and a sealing ring. The top cover is connected to the explosion-proof disc, the isolation ring and the connecting plate in sequence to form a cap inner core, and the sealing ring is sleeved on the cap covering the periphery of the inner core. The cylindrical lithium battery cap effectively reduces the formation of aluminum melt beads and improves the overall safety performance of the battery pack. However, the existing cylindrical battery cap includes many structural parts. If it is too large, under the pressure of the top cover, the notch on the explosion-proof disc cannot be disconnected in time, which may easily cause a risk of short circuit of the battery and even a safety hazard.

Technical Problem

The purpose of the embodiments of the present application is to provide a full-tab cylindrical lithium battery cap, which aims to solve the problem of the cylindrical battery cap in the existing technology that when the internal pressure of the battery is too high, under the pressure of the top cover, the notch on the explosion-proof disc cannot be disconnected in time, which would easily cause the risk of short circuit of the battery.

SUMMARY

In order to achieve the above purpose, the technical solution adopted in the present application is to provide a full-tab cylindrical lithium battery cap, including an explosion-proof valve, an isolation ring, a connecting plate and a sealing ring. The isolation ring is arranged between the explosion-proof valve and the connecting plate, and the sealing ring is sleeved on an edge of the explosion-proof valve.

The explosion-proof valve includes a connecting portion and an explosion-proof portion. The connecting portion is arranged along a circumference of the explosion-proof portion, the isolation ring is arranged at a bottom of the connecting portion. And an edge of the connecting portion abuts on the sealing ring, and the explosion-proof portion is provided with a rupture line. The connecting portion is thicker than the explosion-proof portion.

Furthermore, a bottom of the explosion-proof portion abuts on the connecting plate.

Furthermore, the connecting plate is provided with a groove, the isolation ring comprises a first isolation portion and a second isolation portion. The first isolation part is connected to the second isolation portion, the first isolation portion is arranged between a groove edge of the groove and the connecting portion. The second isolation portion is arranged inside the groove and located between an edge of the explosion-proof portion and a bottom of the groove.

Furthermore, the rupture line is arranged close to the connecting portion.

Furthermore, a longitudinal section of the explosion-proof portion is an arc-shaped structure.

Furthermore, a thickness of the explosion-proof portion gradually increases along a direction from the center of the explosion-proof portion toward an edge of the explosion-proof portion.

Furthermore, a hemming structure is provided on the sealing ring, and the hemming structure is wrapped around an edge of the connecting portion.

Furthermore, the isolation ring is thicker than the connecting plate, and the isolation ring is thinner than the connecting portion.

Furthermore, the connecting portion is provided with a bent portion, the bent portion is connected to the explosion-proof portion, and the bent portion is connected to the explosion-proof portion, the bent portion is enclosed with the explosion-proof portion to form a slot.

The present application also provides a full-tab cylindrical lithium battery, including the full-tab cylindrical lithium battery cap of any one embodiment above.

Beneficial Effect

The beneficial effect of the full-tab cylindrical lithium battery cap provided by the present application is: compared with the prior art, by the thickness arrangement of the connecting portion of the explosion-proof valve and the explosion-proof portion, when the internal pressure of the battery is too high, the rupture line on the explosion-proof valve is broken, and the explosion-proof valve is broken, and the gas flow will be released in this area to ensure the safety of the battery, avoiding that the cap with a top cover in the prior art is easy to cause the risk of short circuit of the battery when the internal pressure of the battery is too high. At the same time, in this application, the connecting portion of the explosion-proof valve is thicker than the explosion-proof portion, so that the thickness of the connecting portion is designed to ensure that the cap strength after the top cover is removed, the thickness of the explosion-proof portion is designed to ensure that the rupture line on the explosion-proof valve can be broken in time to disconnect the electrical connectors to ensure the safety of the battery. The electrical connector can be directly connected to the connecting portion of the aluminum explosion-proof valve, which reduces the contact resistance. At the same time, compared with the cap in the prior art, the top cap is removed, which reduces the resistance of the overall cap.

BRIEF DESCRIPTION OF DRAWINGS

In order to illustrate the technical solutions in the embodiments of the present application more clearly, the following briefly introduces the accompanying drawings that need to be used in the description of the embodiments or the prior art. Obviously, the drawings in the following description are only for the present application. In some embodiments, for those of ordinary skill in the art, other drawings can also be obtained according to these drawings without any creative effort.

FIG. 1 is the sectional schematic diagram of the full-tab cylindrical lithium battery cap provided by an embodiment of the present application.

The details of the symbols involved in the above drawings are as follows:

10—explosion-proof valve; 11—connecting portion; 12—explosion-proof portion; 13—rupture line; 14—bent portion;
20—isolation ring; 21—first isolation portion; 22—second isolation portion;
30—connecting plate; 31—groove;
40—sealing ring; 41—hemming structure.

DETAILED DESCRIPTION

In order to make the technical problems to be solved by the present application, technical solutions and beneficial effects clearer, the present application will be described in further detail below with reference to the accompanying drawings and embodiments. It should be understood that the specific embodiments described herein are only used to explain the present application, but not to limit the present application.

It should be noted that when an element is referred to as being "fixed to" or "arranged on" another element, it can be directly on the other element or indirectly on the other element. When an element is referred to as being "connected to" another element, it can be directly connected to the other element or indirectly connected to the other element.

It is to be understood that the terms "length", "width", "upper", "lower", "front", "rear", "left", "right", "vertical", "horizontal", "top", "bottom", "inside", "outside", etc. indicate the orientation or positional relationship based on the orientation or positional relationship shown in the accompanying drawings, only for the convenience of describing the application and simplifying the description, rather than indicating or implying the indicated device or element must have a particular orientation, be constructed and operate in a particular orientation, and therefore should not be construed as a limitation of the present application.

In addition, the terms "first" and "second" are only used for descriptive purposes, and should not be construed as indicating or implying relative importance or implying the number of indicated technical features. Thus, a feature defined as "first" or "second" may expressly or implicitly include one or more of that feature. In the description of the present application, "a plurality of" means two or more, unless otherwise expressly and specifically defined.

In order to illustrate the technical solutions described in the present application, a detailed description is given below with reference to the specific drawings and embodiments.

Figure 1:
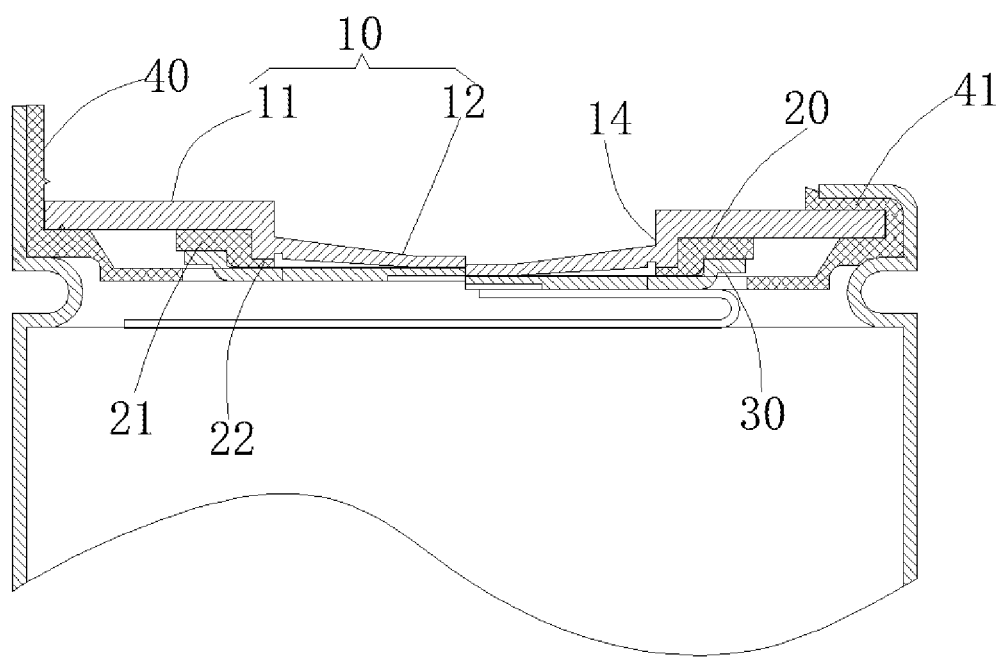
Figure 2:
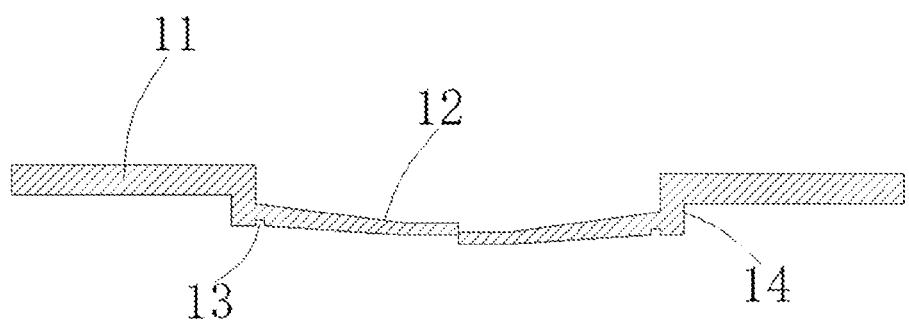
FIG. 2 is a schematic diagram of an explosion-proof valve of a full-tab cylindrical lithium battery cap provided by an embodiment of the present application.
Figure 3:
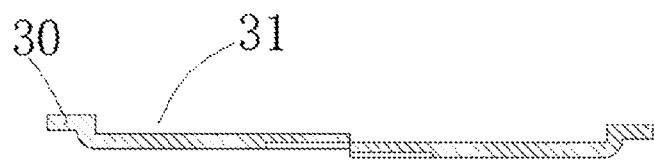
FIG. 3 is a schematic diagram of a connecting plate of a full-tab cylindrical lithium battery cap provided by an embodiment of the present application.

As shown in FIGS. 1-3, an embodiment of the present application provides a all-tab cylindrical lithium battery cap, including an explosion-proof valve 10, an isolation ring 20, a connecting plate 30 and a sealing ring 40, the isolation ring 20 is arranged between the explosion-proof valve 10 and the connecting plate 30, the sealing ring 40 is sleeved on the edge of the explosion-proof valve 10;

The explosion-proof valve 10 includes a connecting portion 11 and an explosion-proof portion 12, the connecting portion 11 is arranged along the circumferential direction of the explosion-proof portion 12, the isolation ring 20 is arranged at the bottom of the connecting portion 11, and the edge of the connecting portion 11 abuts on the sealing ring 40, the rupture line 13 is arranged on the explosion-proof portion 12, and the connecting portion 11 is thicker than the explosion-proof portion 12.

The full-tab cylindrical lithium battery cap provided in the embodiment of the present application is formed by combining the explosion-proof valve 10, the isolation ring 20, the connecting plate 30 and the sealing ring 40, which removes the top cover in the prior art, reduces the number of parts of the cap, and decreases the resistance of the cap. Specifically, by arranging the thickness of the connecting portion 11 and the explosion-proof portion 12 of the explosion-proof valve 10, the use of the top cover in the cap is eliminated. When the internal pressure of the battery is too large, the rupture line 13 on the explosion-proof valve 10 is broken, thus the explosion-proof valve 10 ruptures, the gas flow will release from this area to ensure the safety of the battery, avoiding the risk that the cap with a top cover in the prior art is easy to cause a short circuit of the battery when the internal pressure of the battery is too large. At the same time, in this application, the connecting portion 11 of the explosion-proof valve 10 is thicker than the explosion-proof portion 12, so that the thickness of the connecting portion 11 can be designed to ensure the strength of the cap after removing the top cover, and the thickness of the explosion-proof portion 12 can be designed to ensure that the rupture line 13 on the explosion-proof valve 10 can be broken in time to disconnect the electrical connectors to ensure the safety of the battery. In addition, compared with the cap in the prior art, the nickel-plated steel top cover is removed, thus the external electrical connecting piece can be directly connected to the connecting portion 11 of the aluminum explosion-proof valve 10, which reduces the contact resistance. At the same time, compared with the cap in the prior art, the removal of the top cover structure reduces the manufacturing cost of the product and enhances the market competitiveness.

It should be noted that the explosion-proof valve 10 can be made of aluminum material.

In some embodiments of the present application, optionally, as shown in FIG. 1, the bottom of the explosion-proof portion 12 abuts on the connecting plate 30.

In this embodiment, the bottom of the explosion-proof portion 12 abuts on the connecting plate 30, that is, when the internal pressure of the battery is too large, the abutting connection between the connecting plate 30 and the bottom of the explosion-proof portion 12 facilitates the broken of the rupture line 13 on the explosion-proof valve 10, thus the pressure relief and venting can be carried out in time, thereby improving the safety performance of the product.

In some embodiments of the present application, optionally, as shown in FIG. 1 and FIG. 3, a groove 31 is provided on the connecting plate 30, and the isolation ring 20 comprises a first isolation portion 21 and a second isolation portion 22, and the first isolation portion 21 and the second isolation portion 22 are connected, the first isolation portion 21 is arranged between the groove edge of the groove 31 and the connecting portion 11, the second isolation portion 22 is arranged inside the groove 31, and is between the edge of the explosion-proof portion 12 and the groove bottom of the groove 31.

In this embodiment, specifically, the first isolation portion 21 and the second isolation portion 22 form a stepped structure, so that the first isolation portion 21 abuts on the groove edge of the groove 31, and the second isolation portion 22 is located on the bottom of the groove under the groove wall to realize the isolation of the connecting portion 11 from the connecting plate 30.

In some embodiments of the present application, optionally, as shown in FIG. 2, the rupture line 13 is arranged close to the connecting portion 11.

Optionally, the longitudinal section of the explosion-proof portion 12 has an arc-shaped structure. Optionally, the thickness of the explosion-proof portion 12 gradually increases along the direction from the center of the explosion-proof portion 12 toward the edge of the explosion-proof portion 12.

In this embodiment, the thickness of the explosion-proof portion 12 gradually increases from its center to its edge. At the same time, the rupture line 13 is arranged close to the connecting portion 11. When the internal pressure of the battery is too large, the bottom of the explosion-proof portion 12 and the connecting plate 30 will be contacted, the connecting plate 30 exerts upward pressure on the bottom of the explosion-proof portion 12, which facilitates elastic deformation in the middle of the explosion-proof portion 12, and further breaks the rupture line 13 close to the connecting portion 11, which facilitates the discharge of pressure.

In some embodiments of the present application, optionally, as shown in FIG. 1, the sealing ring 40 is provided with a hemming structure 41, and the hemming structure 41 is wrapped around the edge of the connecting portion 11.

In this embodiment, the sealing ring 40 may be made of a plastic material, and the sealing effect thereof is improved by the hemming structure 41 crimping the edge of the connecting portion 11 of the explosion-proof portion 12.

In some embodiments of the present application, optionally, as shown in FIG. 1, the isolation ring 20 is thicker than the connecting plate 30 and thinner than the connecting portion 11.

In this embodiment, the thickness of the isolation ring 20 is arranged to ensure the isolation and insulation effect between the explosion-proof valve 10 and the connecting plate 30, and at the same time, to ensure the overall structural strength of the cap.

In some embodiments of the present application, optionally, as shown in FIGS. 1 and 2, the connecting portion 11 is provided with a bent portion 14, the bent portion 14 is connected to the explosion-proof portion 12, and the bent portion 14 is enclosed with the explosion-proof portion 12 to form a slot.

In this embodiment, the bent portion 14 on the connecting portion 11 and the explosion-proof portion 12 are enclosed to form a slot, the longitudinal section of the explosion-proof valve 10 is a half rectangle, as shown in the figure, a direction along the vertical direction of the figure is the longitudinal direction, which increases the explosion space of the explosion-proof portion 12, facilitating pressure relief and venting.

The embodiments of the present application also provide a full-tab cylindrical lithium battery with the full-tab cylindrical lithium battery cap described in any of the above embodiments.

The full-tab cylindrical lithium battery provided in the embodiments of the present application has the full-tab cylindrical lithium battery cap described in any of the above embodiments, and all the beneficial effects of the full-tab cylindrical lithium battery cap will not be described in details.

In summary, the full-tab cylindrical lithium battery cap provided in the examples of this application is formed by combining an explosion-proof valve, an isolation ring, a connecting plate and a sealing ring, which removes the top cap in the prior art, reduces the number of parts of the cap and decreases the resistance of the cap. By the thickness arrangement of the connecting portion of the explosion-proof valve and the explosion-proof portion, when the internal pressure of the battery is too high, the rupture line on the explosion-proof valve is broken, the explosion-proof valve ruptures, and the gas flow will release from in this area to ensure the safety of the battery, avoiding the risk that the cap with a top cover in the prior art is easy to cause short circuit of the battery when the internal pressure of the battery is too large. At the same time, in this application, the connecting portion of the explosion-proof valve is thicker than the explosion-proof portion, so that the thickness of the connecting portion is designed to ensure the strength of the cap after the top cover is removed, and the thickness of the explosion-proof portion is designed to ensure that the rupture line on the explosion-proof valve can be broken in time to disconnect the electrical connectors to ensure the safety of the battery. In addition, the nickel-plated steel top cover is removed, thus the external electrical connectors can be directly connected to the connecting portion of the aluminum explosion-proof valve, reducing the contact resistance.

The above descriptions are only optional embodiments of the present application, and are not intended to limit the present application. Any modifications, equivalent replacements and improvements made within the spirit and principles of the present application shall be within the protection scope of the present application.

What is claimed is:

1. A full-tab cylindrical lithium battery cap without a head cover, comprising,
an explosion-proof valve,
an isolation ring,
a connecting plate, and
a sealing ring;
wherein
the isolating ring is arranged between the explosion-proof valve and the connecting plate, and the sealing ring is sleeved on an edge of the explosion-proof valve;
the explosion-proof valve comprises a connecting portion and an explosion-proof portion, the connection portion is arranged along a circumference of the explosion-proof portion, the isolation ring is arranged at a bottom of the connecting portion, an edge of the connecting portion abuts on the sealing ring, and the explosion-proof portion is provided with a rupture line, and the connecting portion is thicker than the explosion-proof portion;
the connecting portion is provided with a bent portion, the bent portion is connected to the explosion-proof portion, and the bent portion is enclosed with the explosion-proof portion;
wherein the connecting plate is provided with a groove, the isolation ring comprises a first isolation portion and a second isolation portion, the first isolation portion is connected to the second isolation portion, the first isolation portion is arranged between a groove edge of the groove and the connecting portion, and the second isolation portion is arranged inside the groove and located between an edge of the explosion-proof portion and a bottom of the groove;

wherein the first isolation portion abuts on the groove edge of the groove, the second isolation portion is located on the bottom of the groove, and the first isolation portion and the second isolation portion form a stepped structure;

wherein the isolation ring is thicker than the connecting plate, and the isolation ring is thinner than the connecting portion.

2. The full-tab cylindrical lithium battery cap of claim 1, wherein a bottom of the explosion-proof portion abuts on the connecting plate.

3. The full-tab cylindrical lithium battery cap of claim 1, wherein the rupture line is arranged close to the connecting portion.

4. The full-tab cylindrical lithium battery cap of claim 1, wherein a longitudinal section of the explosion-proof portion is an arc-shaped structure.

5. The full-tab cylindrical lithium battery cap of claim 1, wherein a thickness of the explosion-proof portion gradually increases along a direction from the center of the explosion-proof portion toward an edge of the explosion-proof portion.

6. The full-tab cylindrical lithium battery cap of claim 1, wherein a hemming structure is provided on the sealing ring, and the hemming structure is wrapped around the edge of the connecting portion.

7. A full-tab cylindrical lithium battery, comprising a full-tab cylindrical lithium battery cap without a head cover, the full-tab cylindrical lithium battery cap comprising:
   an explosion-proof valve,
   an isolation ring,
   a connecting plate, and
   a sealing ring;
   wherein,
   the isolating ring is arranged between the explosion-proof valve and the connecting plate, and the sealing ring is sleeved on an edge of the explosion-proof valve;
   the explosion-proof valve comprises a connecting portion and an explosion-proof portion, the connection portion is arranged along a circumference of the explosion-proof portion, the isolation ring is arranged at a bottom of the connecting portion, an edge of the connecting portion abuts on the sealing ring, and the explosion-proof portion is provided with a rupture line, and the connecting portion is thicker than the explosion-proof portion;
   the connecting portion is provided with a bent portion, the bent portion is connected to the explosion-proof portion, and the bent portion is enclosed with the explosion-proof portion;
   wherein the connecting plate is provided with a groove, the isolation ring comprises a first isolation portion and a second isolation portion, the first isolation portion is connected to the second isolation portion, the first isolation portion is arranged between a groove edge of the groove and the connecting portion, and the second isolation portion is arranged inside the groove and located between an edge of the explosion-proof portion and a bottom of the groove;
   wherein the first isolation portion abuts on the groove edge of the groove, the second isolation portion is located on the bottom of the groove, and the first isolation portion and the second isolation portion form a stepped structure;
   wherein the isolation ring is thicker than the connecting plate, and the isolation ring is thinner than the connecting portion.

8. The full-tab cylindrical lithium battery of claim 7, wherein a bottom of the explosion-proof portion abuts on the connecting plate.

9. The full-tab cylindrical lithium battery of claim 7, wherein the rupture line is arranged close to the connecting portion.

10. The full-tab cylindrical lithium battery of claim 7, wherein a longitudinal section of the explosion-proof portion is an arc-shaped structure.

11. The full-tab cylindrical lithium battery of claim 7, wherein a thickness of the explosion-proof portion gradually increases along a direction from the center of the explosion-proof portion toward an edge of the explosion-proof portion.

12. The full-tab cylindrical lithium battery of claim 7, wherein a hemming structure is provided on the sealing ring, and the hemming structure is wrapped around the edge of the connecting portion.

* * * * *